Feb. 13, 1968  P. D. NEWHOUSE ETAL  3,369,241
PASSIVE DETECTION AND DIRECTION FINDING APPARATUS
Filed Feb. 13, 1957  4 Sheets-Sheet 1

WITNESSES
Robert C. Baird
Leon M. Garman

INVENTORS
Paul D. Newhouse &
Charles M. Allen.
BY
Maury I. Hull
ATTORNEY

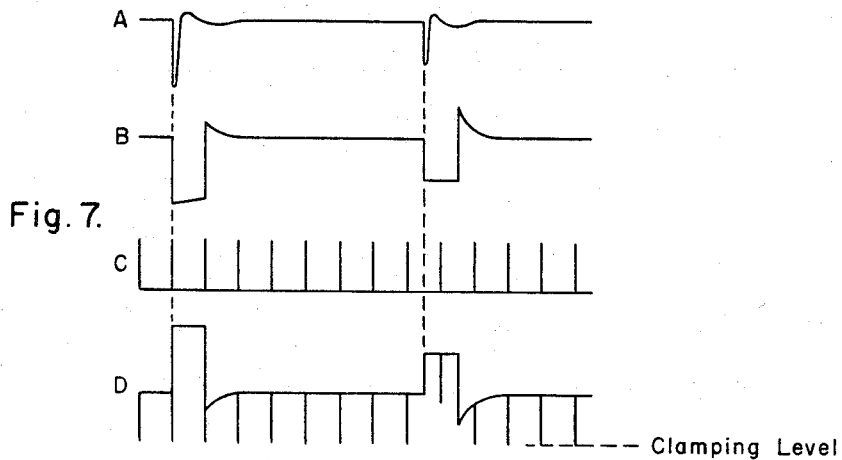
Fig. 7.
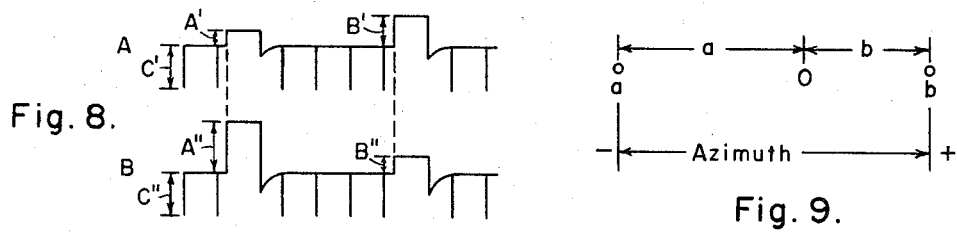
Fig. 8.
Fig. 9.
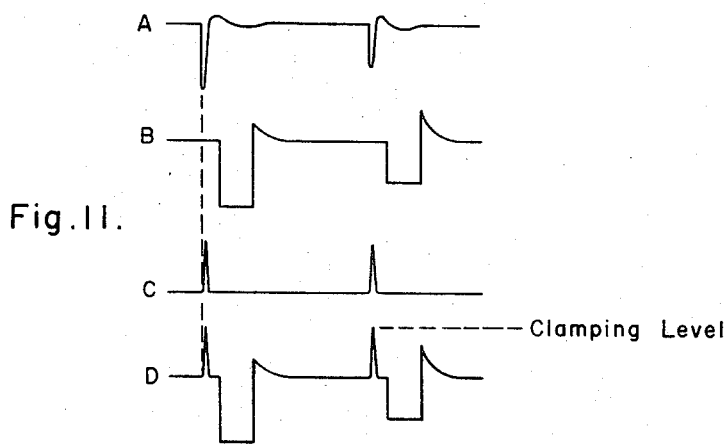
Fig. 11.

United States Patent Office 3,369,241
Patented Feb. 13, 1968

3,369,241
PASSIVE DETECTION AND DIRECTION
FINDING APPARATUS
Paul D. Newhouse, Linthicum Heights, and Charles M. Allen, Arbutus, Md., assignors to Westinghouse Electric Corporation, East Pittsburgh, Pa., a corporation of Pennsylvania
Filed Feb. 13, 1957, Ser. No. 640,049
18 Claims. (Cl. 343—119)

This invention relates to passive radio detection and direction finding apparatus and more particularly to radio detection and direction finding apparatus for accurately displaying directional data.

Passive radio detection and direction finding apparatus, as the name implies, is direction finding apparatus having no source of radiant energy but utilizing a source of radiant energy located elsewhere for obtaining directional information about the source with respect to the location of the direction finding apparatus, and also for obtaining other information, for example, the closing time between the source and the passive direction finding apparatus, where there is relative motion between these two.

Directional information may be conveniently displayed by a cathode ray tube having vertical and horizontal deflection plates, a luminous spot being provided on the screen of the tube in a position representing the elevation and azimuth of the source of radiant energy with respect to a preselected direction or axis from the direction finding apparatus.

In prior art passive radio detection and direction finding apparatus, particularly direction finding apparatus employing cathode ray tube indicator means, difficulty is frequently encountered because the pulses supplied by detectors or demodulators energized from directional antennas are not of sufficient duration and uniformity to provide stable indications.

The apparatus of the instant invention is particularly well adapted to overcome the above described disadvantages and limitations of the prior art. In apparatus embodying the instant invention, the outputs of the detectors or amplifiers are delivered to pulse stretching circuits. The stretched pulses have added thereto signal portions at least as great in amplitude as the undershoots or overshoots which the stretched pulses have and of the same polarity, the added signal portions shifting the base lines predetermined constant amounts and rendering the overshoots or undershoots ineffective to disturb the base lines, thereby providing for stable and accurate indications on the screen of the cathode ray tube indicator.

An object of the invention is to provide new and improved passive radio detection and direction finding apparatus.

Another object is to provide new and improved radio detection and direction finding apparatus having means for accurately displaying directional data.

Still another object is to provide new and improved passive radio detection and direction finding apparatus having means for accurately indicating the direction of a source of pulsed radiation with respect to the direction finding apparatus.

Other objects and advantages will become apparent after a perusal of the accompanying specification when studied in connection with the accompanying drawings, in which:

FIG. 7 is a graph illustrating the operation of the apparatus of FIG. 6;

FIG. 8 is an additional graph illustrating the operation of the apparatus of FIG. 6;

FIG. 9 is a diagram illustrating spot target positions as they would result from the signals of FIG. 8;

FIG. 11 is a graph illustrating the operation of a clamping circuit according to the second embodiment of the invention.

Figure 1:
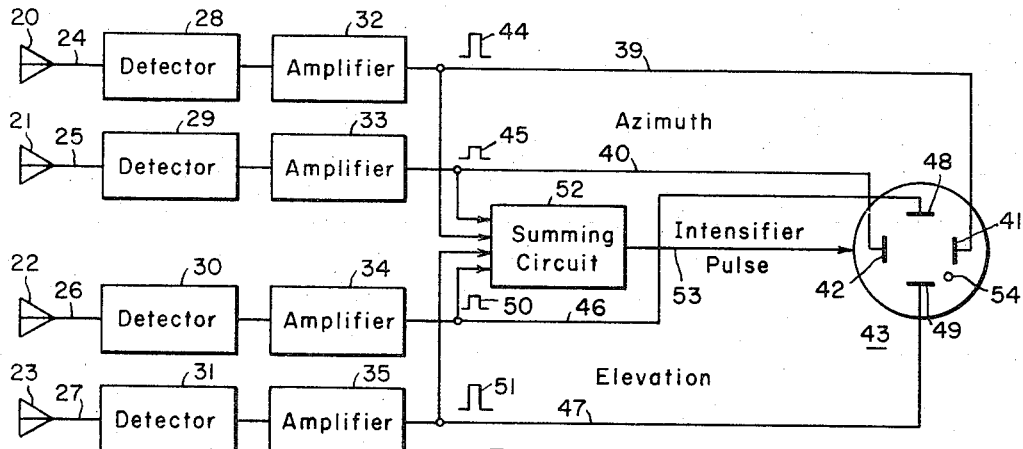
FIG. 1 is a block diagram of simple passive radio detection and direction finding apparatus employing cathode ray tube means for indicating the azimuth and elevation of a target or source of pulsed radiant energy, and is shown to assist in describing the instant invention.

Particular attention should be made now to the drawings, in which like reference numerals are used throughout to designate like parts, for a more complete understanding of the invention, and in particular to FIG. 1 thereof. It should be recalled that the apparatus of the instant invention relates to direction finding apparatus of the type in which the desired information about the source is presented on the screen of a cathode ray tube as elevation and azimuth with respect to some preselected direction from the radio detection and direction finding apparatus. For convenience of illustration in describing the invention, it will be assumed that the direction finding apparatus is employed on aircraft, but its use is not limited to airborne direction finding apparatus. While mounted on aircraft, the preselected direction may conveniently be the longitudinal axis of the aircraft, or some other axis having a predetermined angle with respect to the longitudinal axis of the aircraft.

In FIG. 1, four substantially similar antennas 20, 21, 22 and 23 deliver their outputs by way of conductor means 24, 25, 26 and 27 respectively to suitable detectors shown in block form and designated 28, 29, 30 and 31, respectively, the detectors delivering their outputs to suitable amplifiers which may be of conventional design and which are shown in block form and designated 32, 33, 34 and 35, respectively. Preferably, all of the detectors are similar to each other, and all of the amplifiers are similar to each other, being all linear or all logarithmic.

Figure 3:
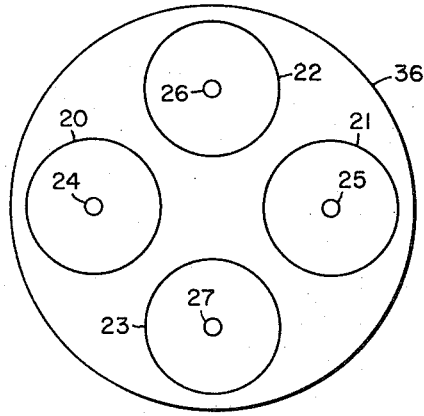
FIG. 3 is a front elevational view of the antenna apparatus employed in the passive radio detection and direction finding apparatus of FIG. 1.
Figure 4:
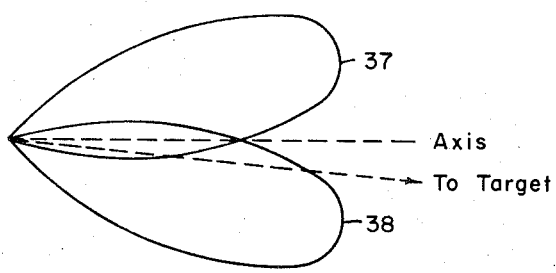
FIG. 4 is a diagrammatic view illustrating the directional patterns of response of two of the antennas of FIG. 3.

In FIG. 3, to which particular reference is now made, the arrangement of the aforementioned antennas with respect to each other is shown. FIG. 3 may be a front elevational view of the antennas, and may be a view looking toward the nose of the aircraft from a point in front of the aircraft. The mounting plate 36 is secured to the aircraft by any convenient means, not shown, and is perpendicular to the axis of reference which as aforementioned, may be the longitudinal axis of the aircraft. Antennas 20 and 21 provide azimuth information whereas antennas 22 and 23 provide elevation information. All of the antennas may be of conventional design giving desired directional patterns of response such for example, as the patterns 37 and 38 of FIG. 4 which may be the patterns of response of antennas 22 and 23, respectively. Patterns 37 and 38 are oriented in a first normally vertical plane. The antennas may be of the horn type or of the spiral type, if desired. The aforementioned wave guides or other conducting means 24, 25, 26 and 27 are employed for conducting energy from the antennas to the respective detectors. It should be understood that the patterns of azimuth antennas 20 and 21 may be similar to the shown patterns 37 and 38 of the elevation antennas, except that the patterns of antennas 20 and 21 are oriented in a normally substantially horizontal plane. It should be noted that the patterns of response of antennas 20 and 21, and of antennas 22 and 23, are substantially symmetrical and that they overlap over predetermined portions thereof, and that the plane of overlap of the elevation antennas is substantially perpendicular to the plane of overlap of the azimuth antennas, and further that the axis of reference or predetermined direction used as a reference direction lies in both of the aforementioned planes.

Assume now, by way of example, that the pulses reaching all four of the antennas originate from a source lying to the right of the dead-ahead direction and an equal distance below the dead-ahead direction or longitudinal axis of the aircraft. For the purposes of this description, the angle of attack will be neglected. In that event, because of the aforementioned directional characteristics of the four antennas shown in FIG. 3, the pulse output from amplifier 32 will exceed in amplitude the pulse output from amplifier 33, the outputs of the amplifiers 32 and 33 being applied by way of leads 39 and 40, respectively, to horizontal deflection plates 41 and 42, respectively, of a cathode ray tube generally designated 43, the relative pulse amplitudes being illustrated by pulses 44 and 45 respectively.

In like manner, the outputs of the aforementioned elevation signal amplifiers 34 and 35 are applied by way of leads 46 and 47, respectively, to vertical deflection plates 48 and 49 respectively, the relative amplitudes of the pulses being illustrated by pulses 50 and 51, respectively. All of the pulse outputs on leads 39, 40, 46 and 47 are applied to a summing circuit shown in block form and designated by the reference numeral 52, the summing circuit being of conventional design. From the summing circuit is obtained an intensifier pulse which is applied by way of lead 53 to an intensity control grid, not shown in FIG. 1, of the cathode ray tube generally designated 43.

It will be noted that pulse 44 and pulse 45 are of positive polarity and that pulse 44 is considerably greater in amplitude than pulse 45 with the result that the beam of the cathode ray tube 43 is deflected toward plate 41. Similarly, it will be noted that pulses 50 and 51 are of positive polarity and that pulse 51 is considerably greater in amplitude than pulse 50 with the result that the cathode ray tube beam is deflected downward toward plate 49. The relative amplitudes of the various pulses are a result of the directional patterns of response of the antennas shown in FIG. 1, the detectors 28, 29, 30 and 31, and the amplifiers 32, 33, 34 and 35, being constructed and arranged so that for given or similar input signal amplitudes, pulses of similar amplitude are obtained in the outputs thereof. At the same time that pulses 44, 45, 50 and 51 are applied to the deflection plates, an intensifier pulse is supplied by way of the aforementioned lead 53 to the aforementioned intensity control grid, not shown in FIG. 1, with the result that a spot 54 appears on the screen 55 of the cathode ray tube substantially in the position shown, the position of the spot 54 indicating that the target or source of pulse transmission is as aforementioned located to the right of the axis of the aircraft and somewhat below the axis of the aircraft.

Figure 2:
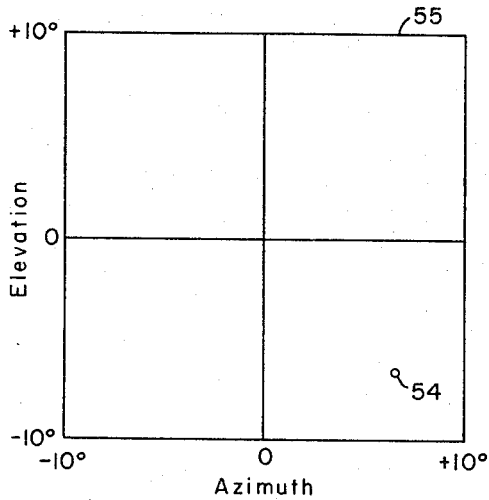
FIG. 2 is a view of the cathode ray tube screen of FIG. 1.

In FIG. 2, there is shown a suitable calibration arrangement for screen 55. The calibration of screen 55 is illustrative, and is dependent upon the patterns of response of the various antennas shown in FIG. 3. If desired, azimuth and elevation scales at least as great as +30 degrees to —30 degrees may be provided, suitable antennas having suitable patterns of response being provided.

The spot 54, is however subject to fluctuation and erratic movement because of the narrowness of the pulses, and variations or fluctuations in pulse amplitude.

The apparatus of the instant invention embodies a number of improvements over the simple passive detection and direction finding apparatus shown in FIGS. 1, 2, 3, and 4, and described in connection therewith. To the apparatus of FIG. 1, for example, it is desirable to add clamping means so that the base lines of the output pulses from the amplifiers do not shift with a resulting destruction of the calibration of the cathode ray tube indicator screen and an erroneous indication of target or pulse source position. In addition, the apparatus of the instant invention employs pulse stretching circuits for stretching the video pulses provided by the various detectors. The pulses may be stretched or broadened to convenient widths of, for example, twenty microseconds. The outputs of the pulse stretchers have overshoots, and these undershoots or overshoots are not constant in amplitude and are not proportional to the amplitudes of the pulses. Pulses of lesser amplitude may have greater overshoots than other pulses of greater amplitude, as illustrated by curve B of FIG. 7, so that conventional clamping circuits are not readily suitable for use in the apparatus of the instant invention. The apparatus of the instant invention provides a clamping arrangement suitable for use with pulse stretchers having overshoots by providing a free-running blocking oscillator which supplies constant amplitude pulses of brief duration and of the same polarity as the pulse undershoots which are added to the stretched pulses, by signal altering means or signal utility increasing means. The constant amplitude pulses such for example as those shown in graph C of FIG. 7 supplied by the free-running blocking oscillator are of a convenient width of, for example, one microsecond, and these pulses have amplitudes greater than those of the greatest undershoots and hence extend beyond the overshoots or undershoots and provide a constant clamping level such, for example, as that shown by curve D of FIG. 7 to be hereinafter discussed in greater detail.

Figure 5:
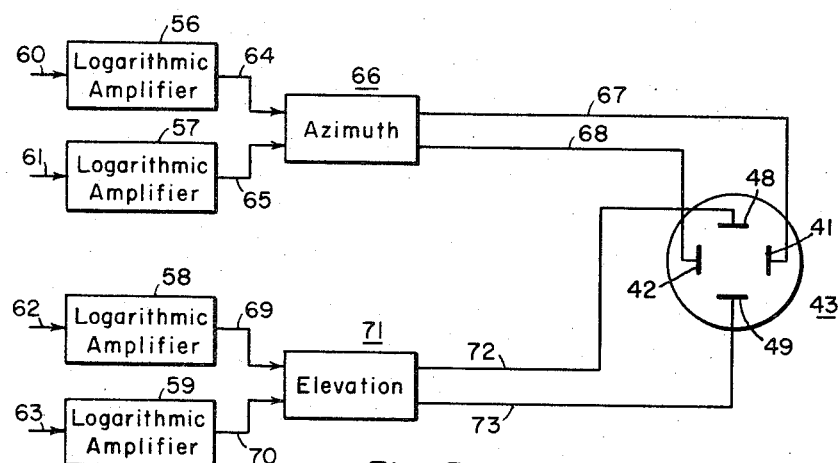
FIG. 5 is a block diagram of radio detection and direction finding apparatus constructed according to the preferred embodiment of the instant invention.
Figure 6:
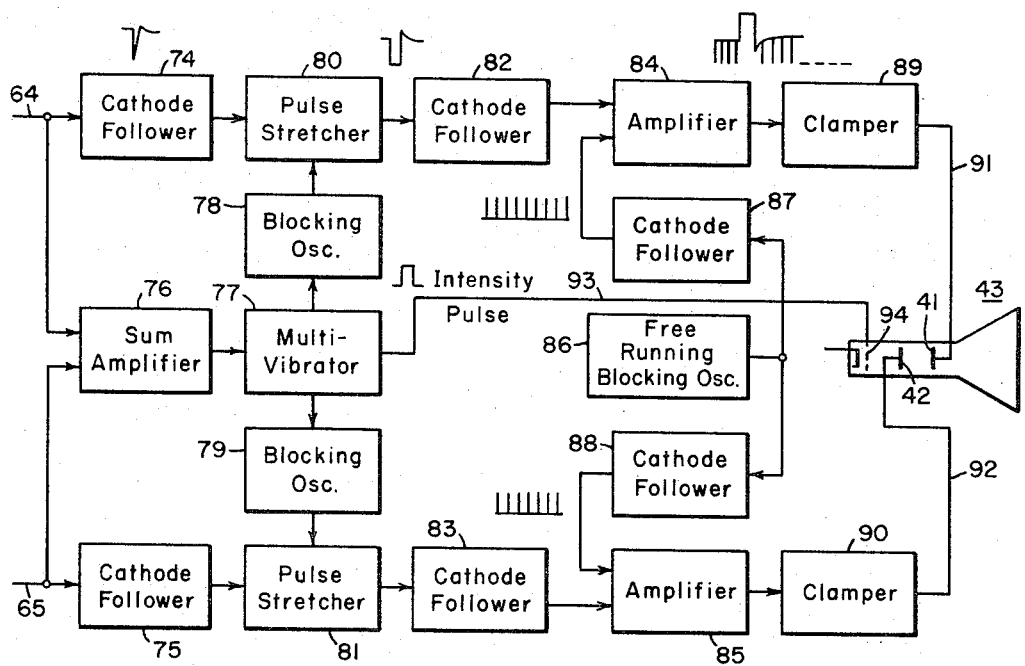
FIG. 6 is a block diagram of the azimuth circuit of FIG. 5.

Particular reference should be made now to FIGS. 5 and 6 in which apparatus constructed according to the preferred embodiment of the instant invention is shown in block form. The amplifiers 56, 57, 58 and 59, which are preferably logarithmic amplifiers, have their inputs supplied by way of leads or conductor means 60, 61, 62 and 63, respectively, which may conduct thereto the outputs of four conventional detectors, not shown, but which may be similar to the detectors 28, 29, 30 and 31 of FIG. 1, which are in turn energized by four directional antennas, not shown, but which may be similar to antennas 20, 21, 22 and 23 of FIG. 1. The logarithmic amplifiers 56 and 57 supply their outputs by way of leads or conductor means 64 and 65, respectively, to an azimuth comparison circuit shown in block form and generally designated 66, the outputs of the azimuth comparison circuit being applied by way of leads 67 and 68 to the afore-mentioned horizontal deflection plates 41 and 42, respectively, of cathode ray tube indicator 43. In like manner, the logarithmic amplifiers 58 and 59 supply their outputs by way of leads or other conducting means 69 and 70 to an elevation comparison circuit generally designated 71, the outputs of the elevation comparison circuit 71 being applied by way of leads 72 and 73 to vertical deflection plates 48 and 49, respectively.

Each of the azimuth and elevation comparison circuits 66 and 71 contains apparatus according to the circuit diagram of FIG. 6, which is the azimuth comparison circuit. It should be understood, however, that the elevation comparison circuit 71 is similar in all respects to the circuit of FIG. 6 except that the outputs thereof are applied to the vertical deflection plates.

In FIG. 6, to which particular attention should now be paid, the outputs of the logarithmic amplifiers 56 and 57 are applied by way of leads 64 and 65, respectively, to a pair of similar cathode followers 74 and 75, which may be of conventional design, and the pulse outputs on leads 64 and 65 are also both applied to a summing amplifier generally designated 76, which may be of conventional design. The pulse output of the summing amplifier 76 triggers a multivibrator 77, which may be of conventional design, and the multivibrator 77 applies its output to two similar blocking oscillators 78 and 79 which may be of conventional design; the outputs of the blocking oscillators 78 and 79 are applied to a pair of pulse stretchers 80 and 81, respectively, the pulse stretchers 80 and 81 also having applied thereto, respectively, the outputs of the aforementioned cathode followers 74 and 75. The pulse stretchers 80 and 81 may be of conventional design, and may each comprise a diode, bucket condenser, and triode discharge tube, and may be similar to a circuit known in the art as a "box-car" circuit. The outputs of the pulse stretchers 80 and 81 are greatly broadened negative pulses having overshoots as illustrated by the shown pulse output of pulse stretcher 80. The outputs of the pulse stretchers 80 and 81 are applied to a pair of conventional cathode followers 82 and 83, respectively, and are thence supplied to a pair of similar amplifiers 84 and 85, respectively.

As aforementioned, in the apparatus of FIG. 6, a free-running blocking oscillator is provided and this is shown in block form at 86. The free-running blocking oscillator 86 may be of conventional design, and applies its output to a pair of similar cathode followers 87 and 88. The output of the blocking oscillator, and hence of the cathode followers 87 and 88 consists of trains of closely spaced pulses of narrow width, as illustrated in FIG. 6 and by curve C of FIG. 7. These outputs of cathode followers 87 and 88 are applied to the aforementioned amplifiers 84 and 85 where they are added to the stretched pulse outputs of the aforementioned cathode followers 82 and 83, the outputs of the amplifiers 84 and 85 being illustrated by the shown pulse shape of the output of amplifier 84 in FIG. 6. The outputs of the aforementioned amplifiers 84 and 85 are applied to a pair of clampers 89 and 90, respectively, which may be of conventional design, and are thence applied by way of leads 91 and 92, respectively, to the azimuth or horizontal deflection plates 41 and 42 of the cathode ray tube indicator 43. The aforementioned multivibrator 77 also applies an intensifier pulse output by way of lead 93 to an aforementioned intensity control grid 94 of cathode ray tube 43.

Particular reference should be made now to FIG. 7 which is a series of graphs illustrating the operation of the apparatus of FIG. 6. Curve 7A indicates the pulse inputs on one lead, for example lead 64, it being noted that for the purposes of better illustrating the invention these pulses are of the same polarity and of different amplitudes. Curve 7B illustrates the outputs of the pulse stretcher 80. It should be noted that the overshoots are of different amplitudes and that they are not proportional in amplitude to the amplitudes of the pulses. Curve 7C illustrates the outputs of both of the cathode followers 87 and 88, these cathode followers being energized from the aforementioned free-running blocking oscillator 86. Curve 7D illustrates the manner in which the pulses from the free-running blocking oscillator are added to the outputs of the pulse stretchers, preventing the overshoot from becoming the clamping level. Because the amplitude of the pulses of graph C is constant and greater than the amplitude of the greatest overshoot the base line remains fixed even though the signals and the associated overshoots vary in amplitude. Because the added pulses are very narrow, for example, one microsecond in width, several of them are required to establish the clamping level; hence the few which may be superimposed on the undershoot are clipped by the clamper.

Particular attention should be paid now to FIG. 8 in which for purposes of illustration the curve 8A illustrates a signal which may be applied by way of lead 91 to the right-hand deflection electrode 41 of cathode ray tube 43, whereas curve 8B illustrates a signal which may be applied by way of lead 92 to the left-hand deflection electrode 42 of the cathode ray tube 43.

In the curve A of FIG. 8, $C'$ represents the clamping level, $A'$ the amplitude of the first pulse and $B'$ the amplitude of the second pulse. In curve B, $C''$ represents the clamping level, $A''$ the amplitude of the first pulse and $B''$ the amplitude of the second pulse. Letting $a$ and $b$ be the resulting beam deflections as shown in FIG. 9, then:

$a=(C'+A')-(C''+A'')$
$b=(C'+B')-(C''+B'')$
If $C'=C''$,
$a=A'-A''$
$b=B'-B''$

Amplitude $C'$ and $C''$ may be adjusted to equality by a centering control, not shown, of any convenient design.

Figure 10:
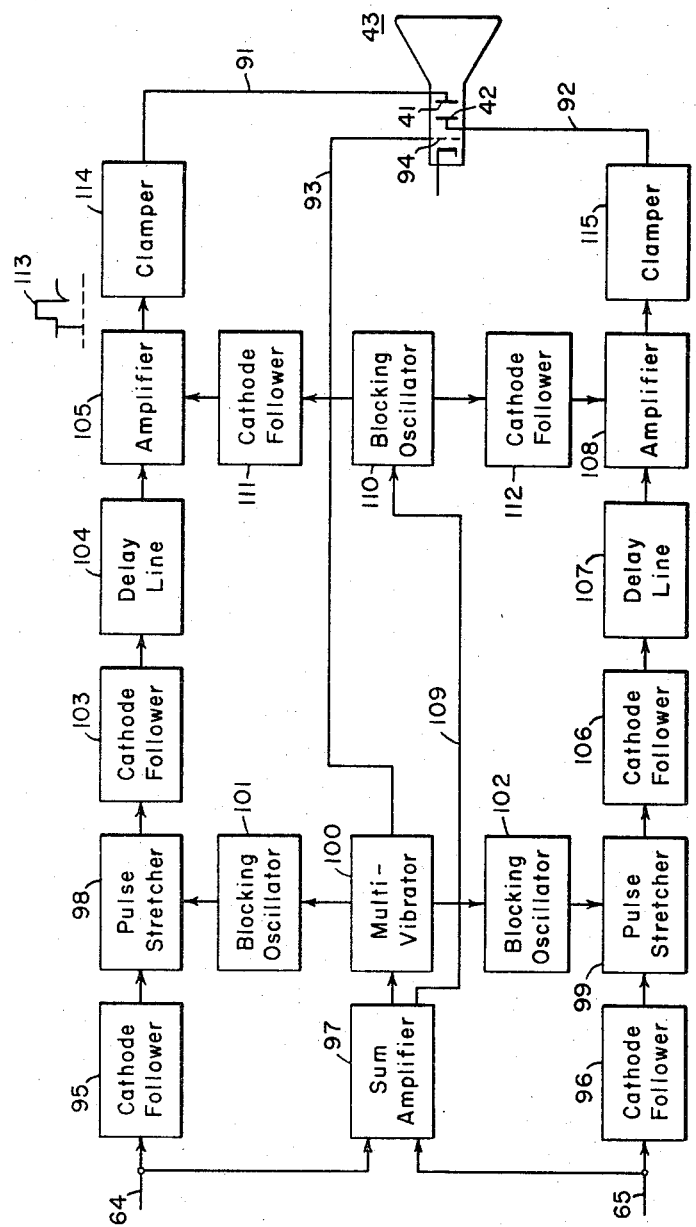
FIG. 10 is a schematic circuit diagram in block form of apparatus constructed according to a second embodiment of the invention.

Particular attention should be paid now to FIG. 10, in which a modification of the invention is shown, the operation of which is illustrated by the curves of FIG. 11. Leads or connecting means 64 and 65 deliver pulses to cathode followers 95 and 96, respectively, and both leads supply inputs to a summing amplifier 97. Cathode follower 95 supplies its output to a pulse stretcher 98, which may be of conventional design, while cathode follower 96 supplies its output to a similar pulse stretcher 99. The aforementioned summing amplifier 97 supplies a trigger to multivibrator 100 which supplies outputs to two blocking oscillators 101 and 102 of conventional design, the blocking oscillators 101 and 102 supplying their outputs to the aforementioned pulse stretchers 98 and 99 respectively. Pulse stretcher 98 supplies the broadened pulse output to cathode follower 103, thence to delay line 104, thence to amplifier 105, while pulse stretcher 99 supplies its broadened pulse output to cathode follower 106, thence to delay line 107, thence to amplifier 108. The aforementioned summing amplifier 97 supplies a triggering pulse by way of lead 109 to blocking oscillator 110, which supplies pulses to both cathode followers 111 and 112 which supply pulse outputs to aforementioned amplifiers 105 and 108 respectively. Both these amplifiers 105 and 108 are constructed and arranged to add the outputs of the cathode followers 111 and 112 to the broadened pulses, to provide amplifier outputs having waveforms illustrated by pulse 113, the clamping level being illustrated by the dashed horizontal line below the pulse. Amplifiers 105 and 108 supply their outputs by way of clampers 114 and 115 respectively, which may be of conventional design, and leads 91 and 92 to the aforementioned horizontal deflection plates 41 and 42. Multivibrator 100 supplies an intensifier pulse on lead 93.

Particular reference should be made now to FIG. 11, in which there is illustrated graphically the aforedescribed modification of the invention. Curve 11A indicates a pulse input to the azimuth circuit, whereas curve 11B illustrates the output of a pulse stretcher after a delay. Curve 11C illustrates clamping pulses supplied by blocking oscillator 110, and curve 11D illustrates how the clamping pulses of curve 11C are added to and provide a clamping level for the pulses of curve 11B, the clamping level being indicated by the dashed line. It should be noted that the clamping pulses of curve 11C may occur a predetermined time, for example, one microsecond, ahead of the delayed stretched pulses.

It will be understood that, according to the modified invention, a circuit similar to that of FIG. 10 is provided for the elevation comparator 71.

Whereas the outputs of the amplifiers 84, 85, 105 and 108 have been shown as positive pulses having undershoots, it should be understood that negative pulses having overshoots could be provided, suitable rearrangement of the circuit being made.

If desired, pairs of antennas having dissimilar patterns of response could be employed, suitable recalibration of the indicator screen being made.

Whereas the invention has been shown and described with reference to two embodiments thereof which give satisfactory results, it should be understood that various changes may be made and equivalents substituted without departing from the scope of the invention.

We claim as our invention:

1. Passive radio detection and direction-finding apparatus comprising, in combination, a first pair of radiant energy receiving antenna means adapted to receive pulses of radiant energy from a source, said first pair of antenna means having similar directional patterns of response, said first pair of antenna means being disposed in predetermined positions with respect to each other whereby the patterns of response overlap to a predetermined degree in a first plane, a second pair of radiant energy receiving antenna means adapted to receive pulses of radiant energy from said source, said second pair of antenna means having similar directional patterns of response, said second pair of antenna means being mounted in predetermined positions with respect to each other whereby the last-named patterns of response overlap to a predetermined degree in a second plane substantially perpendicular to the first plane, four detector means operatively connected to the antenna means of both said pairs respectively for obtaining demodulated outputs therefrom in the form of chains of pulses, the pulses in the output of each of said detector means being substantially proportional in amplitude to the signal strength applied to the detector means in accordance with the directional pattern of response of the antenna means operatively connected thereto, four pulse stretching means operatively connected to and energized from said four detector means respectively, four pulse adding means operatively connected to said four pulse stretching means respectively for adding to the stretched pulses additional pulses of predetermined constant amplitude to provide other deflection pulses, four clamping means operatively connected to said four pulse adding means respectively, and cathode ray tube indicator means including beam forming means and having a pair of horizontal deflection plates and a pair of vertical deflection plates, said cathode ray tube indicator means being operatively connected to said four clamping means, the other deflection pulses from said four clamping means being applied to the deflection plates of the cathode ray tube indicator means whereby the beam is deflected in a first deflection plane according to differences in the amplitudes of the pulses obtained from the first pair of antenna means, and said beam is deflected in a second deflection plane substantially perpendicular to the first deflection plane in accordance with differences in the amplitudes of the pulses obtained from the second pair of said antenna means to thereby provide an indication on said cathode ray tube indicator means of the direction to the source with respect to a preselected direction from all of said antenna means, said preselected direction substantially coinciding with the line of intersection of the first and second planes.

2. Radio detection and direction-finding apparatus comprising, in combination, means for obtaining from received radiant energy a first pair of substantially coincident pulses having amplitudes relative to each other corresponding to the angular direction lying in a first plane which the source of said radiant energy has with respect to a predetermined direction from the direction-finding apparatus, means for obtaining from the received radiant energy a second pair of pulses substantially coincident with the first pair, the second pair of pulses having relative amplitudes with respect to each other corresponding to the angular direction which the source of radiant energy has with respect to said predetermined direction lying in a second plane substantially perpendicular to the first plane, cathode ray tube means including beam forming means and having first and second pairs of deflection plates, the first pair being disposed at a 90 degree angle with respect to the second pair, means for broadening said first pair of pulses and applying the first pair of broadened pulses to the first pair of deflection plates respectively, means for broadening said second pair of pulses and applying the second pair of broadened pulses to the second pair of deflection plates respectively, and clamping means operatively connected to both said pulse broadening means and to said cathode ray tube means for stabilizing the deflection of the beam.

3. Radio detection and direction-finding apparatus comprising, in combination, first signal obtaining means for obtaining from radiant energy received from a source first electrical signals having characteristics corresponding to the direction which said source has with respect to a predetermined direction from the direction-finding apparatus as measured in a first predetermined plane of measurement, second signal obtaining means for obtaining from radiant energy received from said source second electrical signals having characteristics corresponding to the source direction with respect to said predetermined direction as measured in a second plane of measurement substantially perpendicular to the first plane, signal altering means having said first and second electrical signals applied thereto, said signal altering means being constructed and arranged to alter the signals in predetermined manners by stretching the signals and eliminating undesired signal overshoot portions therefrom, and direction indicating means operatively connected to said signal altering means and having said first and second electrical signals applied thereto after alteration by said signal altering means, said indicating means being constructed and arranged to utilize the altered signals to provide an indication of the direction of said source with respect to the predetermined direction as measured in said first and second planes of measurement.

4. Radio detection and direction-finding apparatus comprising, in combination, first signal obtaining means for obtaining from radiant energy received from a source first electrical signals having characteristics corresponding to the direction to the source measured in a first plane of measurement with respect to a predetermined direction from the direction-finding apparatus, second signal obtaining means for obtaining from radiant energy received from said source second electrical signals having characteristics corresponding to the direction to the source with respect to said predetermined direction as measured in a second plane of measurement substantially perpendicular to the first plane, first and second signal altering means operatively connected to said first and second signal obtaining means respectively and energized therefrom, said first and second signal altering means being constructed and arranged to stretch the signals and eliminate undesired signal overshoot portions therefrom, cathode ray tube indicator means including beam forming means and having horizontal deflection plates and vertical deflection plates, means for applying the signal from said first signal altering means to said horizontal deflection plates, and means for applying the signal from the second signal altering means to said vertical deflection plates, said cathode ray tube indicator means being constructed and arranged to utilize the signals applied to the deflection plates thereof to provide a stable trace which has a position indicative of the direction of the source of said radiant energy as measured in the first and second plates of measurement.

5. Radio detection and direction finding apparatus comprising, in combination, first signal obtaining means for obtaining from radiant energy received from a source first pulsed electrical signals having characteristics corresponding to the direction to said source from said direction finding apparatus, said direction being measured in a first plane of measurement with respect to a predetermined direction, second signal obtaining means for obtaining from radiant energy received from said source second pulsed electrical signals having characteristics corresponding to the direction to said source, said last-named direction being measured with respect to said predetermined direction in a second plane of measurement substantially perpendicular to the first plane, first and second signal stabilizing means including pulse stretcher means and signal overshoot eliminating means operatively connected to said first and second signal obtaining means respectively to be energized therefrom, and indicator means operatively connected to said first and second signal stabilizing means, said indicator means being constructed and arranged to utilize the stretched pulses to provide a stable indication of the direction to said source as measured in said first and second planes.

6. Passive detection and direction finding apparatus comprising, in combination, first signal obtaining means for obtaining from radiant energy received from a source first pulsed electrical signals having characteristics corresponding to the direction to said source, said direction being measured with respect to a preselected direction from the direction finding apparatus in a first plane of measurement, second signal obtaining means for obtaining the radiant energy received from said source, second pulsed electrical signals having characteristics corresponding to the direction to the source as measured in a second plane of measurement substantially perpendicular to the first plane and with respect to said preselected direction, means including first and second pulse stretching means and overshoot eliminating means operatively connected operatively connected to said first and second signal obtaining means respectively to be energized therefrom, cathode ray tube means having vertical deflection plate means and horizontal deflection plate means, means for applying the first electrical signals after stretching to the horizontal deflection plate means, and means for applying the second electrical signals after stretching to the vertical deflection plate means, said cathode ray tube means being constructed and arranged to utilize the first and second stretched signals to provide a stable indication of the direction to said source as measured in said first and second planes.

7. Passive detection and direction finding apparatus comprising, in combination, first electrical signal obtaining means for obtaining from radiant energy received from a source first pulsed electrical signals having characteristics corresponding to the direction to the source, said direction being measured with respect to a preselected direction from the direction finding apparatus in a first plane of measurement, second signal obtaining means for obtaining from radiant energy received from said source second pulsed electrical signals having characteristics corresponding to the direction to said source as measured with respect to said preselected direction in a second plane of measurement substantially perpendicular to the first plane, intensifier pulse producing means including summing amplifier means having said first and second electrical signals applied thereto, means including first and second pulse stretching means and clamping means operatively connected to said first and second signal obtaining means respectively and energized therefrom for widening the pulsed electrical signals, cathode ray tube means including beam forming means, horizontal deflection plates, vertical deflection plates, and an intensity control grid, means for applying the signal from the first pulse stretching means to the vertical deflection plates, means for applying the signal from the second pulse stretching means to the horizontal deflection plates, and means for applying said intensifier pulse to the intensity control grid, the deflection of said beam providing a stable indication of the direction to the source from the direction finding apparatus as measured in said first and second planes.

8. Radio detection and direction finding apparatus comprising, in combination, first and second directional signal obtaining means for obtaining from radiant energy received from a source first and second pulsed electrical signals, the directions of maximum response of the first and second directional signal obtaining means being different from each other, both of said first and second pulsed electrical signals having amplitudes corresponding to the direction of said source from said direction finding apparatus, said source direction being measured with respect to a preselected direction in a first plane of measurement, third and fourth directional signal obtaining means for obtaining from radiant energy received from said source third and fourth pulsed electrical signals having amplitudes corresponding to the direction of said source from the direction finding apparatus, the directions of maximum response of the third and fourth directional signal obtaining means being different from each other, said source direction being measured by the third and fourth directional signal obtaining means in a second plane of measurement substantially perpendicular to the first plane, said first and second signal obtaining means including means for causing the first and second pulsed electrical signals to vary in amplitude in a predetermineed manner with respect to each other in accordance with changes in the source direction, said third and fourth signal obtaining means being constructed and arranged to cause the third and fourth pulsed electrical signals to change in amplitude in a predetermined manner with respect to each other in accordance with changes in the source direction, means including damping means and four pulse stretcher means operatively connected to said first, second, third and fourth signal obtaining means respectively to be energized therefrom, and indicator means operatively connected to said first, second, third and fourth pulse stretcher means, said indicator means being constructed and arranged to utilize the stretched pulses to provide a stable indication of the direction to the source as measured in said first and second planes of measurement.

9. Radio detection and direction finding apparatus comprising, in combination, first and second signal obtaining means for obtaining from pulsed radiant energy received from a source first and second substantially coincident pulses, said first and second pulses varying in amplitude with respect to each other in accordance with changes in the direction to said source as measured in a first plane of measurement, third and fourth signal obtaining means for obtaining third and fourth pulses substantially coincident with the first and second pulses and varying in amplitude with respect to each other in accordance with changes in the direction to the source as measured in a second plane of measurement substantially perpendicular to the first plane, first, second, third and fourth pulse stretcher means operatively connected to the first, second, third and fourth signal obtaining means respectively for broadening the pulses obtained thereby, first and second pulse generating means, means for adding the output of the first pulse generating means to the stretched pulses of the first and second pulse stretcher means, means for adding the output of the second pulse generating means to the stretched pulses of the third and fourth pulse stretcher means, and indicator means having the outputs of both said adding means supplied thereto, said indicator means being constructed and arranged to utilize said last-named outputs to provide a stable indication of the direction to the source as measured in said first and second planes.

10. Radio detection and direction finding apparatus comprising, in combination, first electrical signal obtaining means for obtaining from radiant energy received from a source first pulsed electrical signals having characteristics corresponding to the direction to said source, said direction being measured with respect to a preselected direction from the direction-finding apparatus in a first plane of measurement, second signal obtaining means for obtaining from radiant energy received from said source second pulsed electrical signals having characteristics corresponding to the direction to said source from the direction-finding apparatus, said source direction being measured in a second plane of measurement substantially perpendicular to the first plane, intensifier pulse producing means including summing amplifier means having said first and second electrical signals applied thereto, first and second signal altering means operatively connected to said first and second signal obtaining means respectively and constructed and arranged to utilize the signals from the first and second signal obtaining means to obtain other signals of longer duration and having added portions, cathode ray tube means including beam forming means, horizontal deflection plates, vertical deflection plates, and an intensity control grid, means for applying the other signal from the first signal altering means to the vertical deflection plates, means for applying the other signal from the second signal altering means to the horizontal deflection plates, and means for applying the intensifier pulse to the intensity control grid, said cathode ray tube means being constructed and arranged to deflect said beam in a manner to provide a stable indication of the direction of the source as measured in said first and second planes.

11. Passive detection and direction finding apparatus comprising, in combination, a first pair of radiant energy receiving antenna means, said first pair of antenna means having similar directional patterns of response, said first pair of antenna means being disposed in predetermined positions with respect to each other whereby the patterns of response overlap to a predetermined degree, said patterns of response lying in a first plane of measurement, a second pair of radiant energy receiving antenna means, said second pair of antenna means having similar directional patterns of response in a second plane of measurement, said second pair of antenna means being mounted in predetermined position with respect to each other whereby the last-named patterns of response overlap to a predetermined degree, four detector means operatively connected to the four antenna means respectively of both said pairs for obtaining demodulated outputs therefrom in the form of chains of pulses, the pulses in the output of each of said four detector means being proportional in amplitude to the signal strength applied to the detector means in accordance with the directional pattern of response of the antenna means operatively connected thereto and the direction of the source of radiant energy, four signal altering means operatively connected to said four detector means respectively to be energized therefrom, each of said four signal altering means being constructed and arranged to obtain from the signal applied thereto a pulse signal of longer duration and having an added signal portion of predetermined amplitude and other characteristics, and cathode ray tube indicator means including beam forming means and having a pair of horizontal deflection plates and a pair of vertical deflection plates, the outputs of said four signal altering means being applied to the deflection plates of the cathode ray tube indicator means whereby the beam is deflected in a first deflection plane according to differences in the amplitudes of the pulses obtained from the first pair of antenna means, and said beam is deflected in a second deflection plane in accordance with differences in the amplitudes of the pulses obtained from the second pair of antenna means, said first and second deflection planes corresponding to the first and second planes of measurement respectively to thereby provide an indication on said cathode ray tube indicator means of the source of said radiant energy with respect to a preselected direction from all of said antenna means.

12. Radio detection and direction finding apparatus comprising, in combination, a first pair of radiant energy receiving antenna means, said first pair of antenna means having similar directional patterns of response in a first plane of measurement, said first pair of antenna means being disposed in predetermined positions with respect to each other whereby the patterns of response overlap to a predetermined degree, a second pair of radiant energy receiving antenna means, said second pair of antenna means having similar directional patterns of response in a second plane of measurement substantially perpendicular to the first plane, said second pair of antenna means being mounted in predetermined positions with respect to each other whereby the last-named patterns of response overlap to a predetermined degree, four detector means operatively connected to the four antenna means respectively of both said pairs, means including clamping means and four signal altering means operatively connected to said four detector means respectively for obtaining from the outputs of the detector means other outputs having added signal portions of predetermined amplitude, and cathode ray tube means operatively connected to all said four signal altering means, said cathode ray tube means being constructed and arranged to utilize the outputs of the four signal altering means to provide an indication of the direction of a source of radiant energy from the radio detection and direction finding apparatus as measured in said first and second planes of measurement.

13. Radio detection and direction finding apparatus comprising, in combination, a plurality of signal means each including detector means and radiant energy receiving antenna means, the plurality of radiant energy receiving antenna means being mounted in predetermined positions with respect to each other, the plurality of signal means being constructed and arranged to provide a plurality of signal outputs having characteristics corresponding to the direction of a source of radiant energy from the direction finding apparatus as measured in at least one predetermined plane of measurement, a plurality of signal altering means operatively connected to the plurality of signal means respectively for obtaining from the signal outputs other signals having added signal portions of predetermined amplitude and duration, and cathode ray tube indicator means operatively connected to said plurality of signal altering means, said cathode ray tube indicator means being constructed and arranged to utilize the other signals to provide an indication of the direction of the source of radiant energy from the direction finding apparatus as measured in said predetermined plane.

14. Radio detection and direction finding apparatus comprising, in combination, a plurality of signal means each including radiant energy receiving antenna means, said plurality of signal means being constructed and arranged to provide a plurality of signal outputs having characteristics corresponding to the direction of a source of radiant energy with respect to the direction finding apparatus as measured in at least one predetermined plane, a plurality of pulse stretcher means operatively connected to said plurality of signal means respectively for obtaining from the signal outputs other signal outputs of longer duration, a plurality of signal altering means operatively connected to said plurality of pulse stretcher means respectively to be energized therefrom, said signal altering means being constructed and arranged to add to the other signal outputs of the pulse stretcher means signal portions of predetermined amplitude and duration, and cathode ray tube indicator means operatively connected to the plurality of signal altering means, said cathode ray tube indicator means being constructed and arranged to utilize the other signal outputs of the signal altering means to provide a stable indication of the direction to the source of said radiant energy as measured in said predetermined plane.

15. Passive detection and direction finding apparatus comprising, in combination, a first pair of pulsed radiant energy receiving antenna means, said pair of antenna means having similar directional patterns of response in a first plane, said patterns of response overlapping to a predetermined degree, a second pair of pulsed radiant energy receiving antenna means, said second pair of antenna means having similar directional patterns of response in a second plane substantially perpendicular to the first plane, said last-named patterns of response overlapping to a predetermined degree, four detector means operatively connected to the four antenna means respectively of both of said pairs for obtaining pulse outputs, four pulse stretcher means operatively connected to said four detector means respectively to be energized therefrom, each of said pulse stretcher means being constructed and arranged to receive a pulse output from the associated detector means and utilize said last-named pulse output to obtain a pulse of longer duration and having an amplitude proportional to the amplitude of the received pulse, four signal altering means operatively connected to said four pulse stretcher means respectively to be energized therefrom, each of said signal altering means including clamping means and being constructed and arranged to add to the stretched pulse received thereby a signal portion of predetermined amplitude and duration, and indicator means operatively connected to all of said signal altering means, said indicator means being constructed and arranged to utilize the outputs of the signal altering means to provide an indication of the direction to the source of radiant energy as measured in said first and second planes.

16. In radio detection and direction finding apparatus, in combination, antenna means for receiving pulsed radiant energy from a source detector means operatively connected to and energized from said antenna means, said antenna means having directional response characteristics whereby the radiant energy supplied to the detector means varies as the angular direction to the source varies in a predetermined plane of measurement, pulse stretching means including clamping means and pulse overshoot eliminating means operatively connected to and energized from said detector means, and indicator means operatively connected to said pulse stretching means, said indicator means being constructed and arranged to utilize the stretched pulses to provide a stable indication of the direction to said source as measured in said predetermined plane.

17. In radio detection and direction finding apparatus, in combination, a pair of radiant energy receiving antenna means adapted to receive pulses of radiant energy from a source, each of said antenna means having a directional pattern of response, said pair of antenna means being disposed in predetermined positions with respect to each other whereby the patterns of response overlap to a predetermined degree in a predetermined plane, a pair of detector means operatively connected to the pair of antenna means respectively for obtaining demodulated outputs therefrom in the form of chains of pulses, the pulses in the output of each of said detector means being substantially proportional in amplitude to the signal strength applied thereto in accordance with the direction pattern of response of the antenna means operatively connected thereto, pulse stretching means including clamping means and pulse overshoot eliminating means operatively connected to and energized from said pair of detector means, and visual indicator means operatively connected to said pulse stretching means, said visual indicator means being constructed and arranged to utilize the stretched pulses to provide a stable indication of the direction to said source as measured in said predetermined plane.

18. In passive detection and direction finding apparatus, in combination, a pair of radiant energy receiving antenna means adapted to receive pulses of radiant energy from a source, each of said antenna means having a directional pattern of response, said pair of antenna means being disposed in predetermined positions with respect to each other whereby the patterns of response overlap to a predetermined degree in a predetermined plane, a pair of detector means operatively connected to the pair of antenna means respectively for obtaining demodulated outputs therefrom in the form of chains of pulses, the pulses in the output of each of said detector means being substantially proportional in amplitude to the signal strength applied thereto in accordance with the directional pattern of response of the antenna means operatively connected thereto, pulse stretching means operatively connected to and energized from said pair of detector means, means including clamping means operatively connected to said pulse stretching means for adding to the stretched pulses pulsed signal portions having preselected characteristics, and visual indicator means operatively connected to said last-named means for utilizing the stretched pulses and their added signal portions to provide a stable indication of the direction to said source as measured in said predetermined plane.

References Cited
UNITED STATES PATENTS

| | | | |
|---|---|---|---|
| 2,422,122 | 6/1947 | Morton | 343—114.5 |
| 2,771,601 | 11/1956 | Stewart | 343—16 |

RODNEY D. BENNETT, *Primary Examiner.*

CHESTER L. JUSTUS, *Examiner.*

G. J. MOSSINGHOFF, R. E. BERGER

*Assistant Examiners.*